US009450720B2

United States Patent
Park et al.

(10) Patent No.: US 9,450,720 B2
(45) Date of Patent: Sep. 20, 2016

(54) APPARATUS AND METHOD FOR OPERATING ANALOG BEAM IN A BEAM DIVISION MULTIPLE ACCESS SYSTEM

(71) Applicants: Samsung Electronics Co., Ltd., Suwon-si, Gyeonggi-do (KR); KOREA ADVANCED INSTITUTE OF SCIENCE AND TECHNOLOGY, Daejeon (KR)

(72) Inventors: Jeong-Ho Park, Seoul (KR); Yong Hoon Lee, Daejeon (KR); Min-Hyun Kim, Daejeon (KR); Seong-Jin Kim, Daejeon (KR); Hyun-Jeong Kang, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 131 days.

(21) Appl. No.: 14/304,198

(22) Filed: Jun. 13, 2014

(65) Prior Publication Data

US 2014/0369328 A1 Dec. 18, 2014

(30) Foreign Application Priority Data

Jun. 13, 2013 (KR) ........................ 10-2013-0067895

(51) Int. Cl.
| | |
|---|---|
| *H04W 72/04* | (2009.01) |
| *H04L 5/00* | (2006.01) |
| *H04B 7/04* | (2006.01) |
| *H04B 7/26* | (2006.01) |
| *H04B 7/08* | (2006.01) |

(52) U.S. Cl.
CPC ............. *H04L 5/0037* (2013.01); *H04B 7/086* (2013.01); *H04B 7/2643* (2013.01); *H04W 72/046* (2013.01); *H04L 5/0023* (2013.01)

(58) Field of Classification Search
CPC ............ H04W 72/046; H04W 72/04; H04W 72/042; H04W 72/1231; H04W 72/1278; H04W 16/28; H04B 7/04; H04B 7/0413; H04B 7/0617; H04B 7/0621; H04B 7/0626; H04B 7/0632; H04B 7/0643; H04B 7/0684; H04B 7/0695; H04B 7/086; H04B 7/26; H04B 7/2643; H04B 7/2656; H04L 5/0023; H04L 5/0037
See application file for complete search history.

(56) References Cited

U.S. PATENT DOCUMENTS

| | | | |
|---|---|---|---|
| 8,626,080 B2 * | 1/2014 | Sutskover | ................ H01Q 3/26 455/63.4 |
| 9,014,203 B2 * | 4/2015 | Scherzer | ............... H04W 28/18 370/252 |

(Continued)

FOREIGN PATENT DOCUMENTS

JP WO 2009087808 A1 * 7/2009 ........... H04B 7/0617

*Primary Examiner* — Ahmed Elallam
(74) *Attorney, Agent, or Firm* — Jefferson IP Law, LLP

(57) ABSTRACT

A method and apparatus for operating an analog beam is provided. The apparatus includes a hybrid beam-forming structure having a small number of digital chains provided in a digital stage and a signal is transmitted and received in a Time Division Multiple Access (TDMA) scheme. The apparatus includes an analog beam-forming operating unit configured to change the analog beam for a counterpart device for which use of a next frame is to be permitted, upon receiving a request for using the next frame from at least one of multiple devices that transmit and receive signals in units of frames and a communication unit configured to transmit information indicating that the analog beam is changed to permit the use of the next frame by the counterpart device to the multiple devices.

21 Claims, 4 Drawing Sheets

(56) References Cited

U.S. PATENT DOCUMENTS

| | | | |
|---|---|---|---|
| 9,137,698 B2* | 9/2015 | Li | H04W 72/046 |
| 2005/0287962 A1 | 12/2005 | Mehta et al. | |
| 2008/0108310 A1* | 5/2008 | Tong | H04B 7/0617 |
| | | | 455/69 |
| 2009/0312044 A1* | 12/2009 | Hottinen | H04W 72/1231 |
| | | | 455/509 |
| 2010/0112952 A1* | 5/2010 | Molnar | H01Q 1/246 |
| | | | 455/63.1 |
| 2010/0290550 A1* | 11/2010 | Rietman | H04B 7/0404 |
| | | | 375/260 |
| 2013/0039445 A1* | 2/2013 | Hwang | H04B 7/0617 |
| | | | 375/316 |
| 2013/0223251 A1* | 8/2013 | Li | H04W 72/046 |
| | | | 370/252 |
| 2014/0321563 A1* | 10/2014 | Park | H04L 25/03898 |
| | | | 375/260 |
| 2015/0289281 A1* | 10/2015 | Kim | H04L 5/0023 |
| | | | 375/267 |

* cited by examiner

APPARATUS AND METHOD FOR OPERATING ANALOG BEAM IN A BEAM DIVISION MULTIPLE ACCESS SYSTEM

CROSS-REFERENCE TO RELATED APPLICATION(S)

This application claims the benefit under 35 U.S.C. §119(a) of a Korean patent application filed on Jun. 13, 2013 in the Korean Intellectual Property Office and assigned Serial number 10-2013-0067895, the entire disclosure of which is hereby incorporated by reference.

TECHNICAL FIELD

The present disclosure relates to an apparatus and method for adaptively operating an analog beam based on an adaptive antenna technique in a beam division multiple access system.

BACKGROUND

Generally, wireless communication technologies have evolved for capacity improvement, cost reduction, and efficient use of resources.

Thus, in wireless communication, for improvement of capacity and efficient use of resources, various communication schemes have been proposed. For example, schemes for using resources such as time, frequency, code, and space are proposed communication schemes. That is, a Time Division Multiple Access (TDMA) scheme, a Frequency Division Multiple Access (FDMA) scheme, a Code Division Multiple Access (CDMA) scheme, and a Space Division Multiple Access (SDMA) scheme are proposed communication schemes.

In addition, as a communication scheme in a multi-antenna system using a beam, a Beam Division Multiple Access (BDMA) scheme has been proposed.

In the BDMA scheme, a transmitter of a multi-antenna system divides and uses beams by using a large number of antennas. The BDMA scheme is different from the SDMA scheme in a sense that the BDMA scheme allows communication through adaptive beam-forming without channel information. The BDMA scheme presumes that location information of a Base Station (BS) and location information of a Mobile Station (MS) are known. The BDMA scheme is a multiple access scheme using beam-forming and may be applied to a backhaul network between BSs and communication between a BS and an MS.

To obtain improved system capacity, a wireless communication system using the BDMA scheme (hereinafter, referred to as a "BDMA system") considers a Multiple Input Multiple Output (MIMO) environment and analog beam designing. A representative example of such a BDMA system is a BDMA system having a two-stage beam-forming structure (hereinafter, referred to as a "hybrid beam-forming system").

The two-stage beam-forming structure is used to collectively mean an analog-digital beam-forming structure. In another way, the two-stage beam-forming structure may be referred to as "hybrid analog/digital beam-forming", "hybrid RF/baseband beam-forming", or "hybrid beam-forming". In the following description, for convenience of a description, the term "hybrid beam-forming" will be used.

However, the hybrid beam-forming system has a structure in which the number of antennas is greater than the number of digital chains. Thus, designing an analog beam considering channel information of all antennas is not realistic.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an analog/digital beam designing and analog/digital beam operating scheme that are suitable for application to a hybrid beam-forming system using a large number of antennas and a small number of digital chains.

Another aspect of the present disclosure is to provide an adaptive operating scheme for an analog beam and an analog beam designing scheme for the adaptive operating scheme in a hybrid beam-forming system that uses a large number of antennas and a small number of digital chains.

Another aspect of the present disclosure is to provide a beam operating apparatus and method for performing an adaptive analog beam operation by simultaneously considering an analog beam operating environment and a service request of a terminal in a hybrid beam-forming system.

Another aspect of the present disclosure is to provide a beam operating apparatus and method capable of performing an adaptive analog beam operation in response to a service request of a terminal in a hybrid beam-forming system.

Another aspect of the present disclosure is to provide a beam operating apparatus and method capable of performing an adaptive beam operation in a multi-user environment as well as performing beam designing in a hybrid-beam forming system.

Another aspect of the present disclosure is to provide a beam operating apparatus and method capable of performing analog beam designing in a hybrid beam-forming system, in which capacity may be improved using effective channel information.

Another aspect of the present disclosure is to provide a beam operating apparatus and method capable of performing adaptive beam designing in a hybrid beam-forming system even when antenna-specific channel information may not be obtained.

Another aspect of the present disclosure is to provide a wireless terminal (or a Mobile Station (MS)) and method that transmits and receives a signal to and from a Base Station (BS) having a dual-stage beam structure in the unit of a frame having a structure supporting Time Division Duplex (TDD) based on an analog beam operation of the BS in a hybrid beam-forming system.

Other aspects to be provided in the present disclosure may be understood by embodiments described below.

In accordance with an aspect of the present disclosure, a method for operating an analog beam in an analog beam operating apparatus using a hybrid beam-forming structure having a small number of digital chains provided in a digital stage, and transmitting and receiving a signal in a Time Division Multiple Access (TDMA) scheme is provided. The method includes changing the analog beam for a counterpart device for which use of a next frame is to be permitted, upon receiving a request for using the next frame from at least one of multiple devices that transmit and receive signals in units of frames and transmitting information indicating that the analog beam is changed to permit the use of the next frame by the counterpart device to the multiple devices.

In accordance with another aspect of the present disclosure, an apparatus for operating an analog beam using a hybrid beam-forming structure having a small number of digital chains provided in a digital stage, and transmitting and receiving a signal in a Time Division Multiple Access (TDMA) scheme is provided. The apparatus includes an analog beam-forming operating unit configured to change the analog beam for a counterpart device for which use of a next frame is to be permitted, upon receiving a request for using the next frame from at least one of multiple devices that transmit and receive signals in units of frames and a communication unit configured to transmit information indicating that the analog beam is changed to permit the use of the next frame by the counterpart device to the multiple devices.

In accordance with another aspect of the present disclosure, a method for transmitting and receiving, by a wireless terminal, a signal in units of frames supporting a Time Division Multiple Access (TDMA) scheme to and from a Base Station (BS) with a hybrid beam-forming structure having a small number of digital chains provided in a digital stage is provided. The method includes sending a request for using a next frame to the BS in an uplink transmission period of a current frame, receiving information about a counterpart device for which use of the next frame is permitted and information about an analog beam to be changed for the use of the next frame from the BS in a downlink transmission period of the next frame, and transmitting and receiving a signal to and from the BS in the uplink transmission period and the downlink transmission period of the next frame by using the analog beam recognized based on the information about the analog beam to be changed, if the use of the next frame is permitted by the information about the counterpart device.

In accordance with another aspect of the present disclosure, a wireless terminal for transmitting and receiving a signal in units of frames supporting a Time Division Multiple Access (TDMA) scheme to and from a Base Station (BS) with a hybrid beam-forming structure having a small number of digital chains provided in a digital stage is provided. The wireless terminal includes a communication unit configured to send a request for using a next frame to the BS in an uplink transmission period of a current frame and to receive information about a counterpart device for which use of the next frame is permitted and information about an analog beam to be changed for the use of the next frame from the BS in a downlink transmission period of the next frame and a control unit configured to control the communication unit to transmit and receive a signal to and from the BS in the uplink transmission period and the downlink transmission period of the next frame by using the analog beam recognized based on the information about the analog beam to be changed, if the use of the next frame is permitted by the information about the counterpart device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
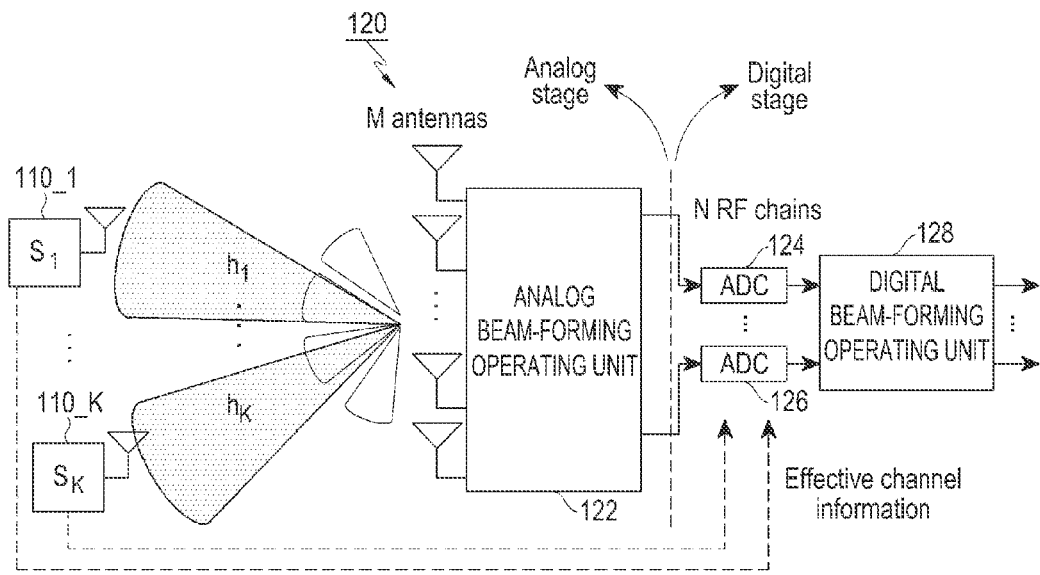
FIG. 1 illustrates a Beam Division Multiple Access (BDMA) system in a multi-user environment for application according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the detailed description of embodiments of the present disclosure, it is assumed that in a Beam Division Multiple Access (BDMA) system in a multi-user environment, a beam operating apparatus uses two stages including an analog stage and a digital stage using a large number of antennas and a small number of digital chains, that is, a dual-stage beam-forming structure.

An embodiment of the present disclosure will provide an analog beam operating scheme that allows a Base Station (BS) to use a hybrid beam-forming system in a multi-user wireless communication environment. Herein, the hybrid beam-forming system represents a wireless communication system in which a BS using a hybrid beam-forming structure and multiple terminals using a single antenna communicate with each other.

An analog beam operating scheme to be provided for this end includes an adaptive beam designing scheme suitable for an operating protocol, required signal and information standards, and a system under consideration.

Herein, the adaptive beam designing scheme prevents data rate degradation that may occur in a basic analog beam operation by using an algorithm that uses effective channel information, simultaneously taking a basic analog beam operating environment and a terminal's request into account. The analog beam operating protocol defines a frame structure and an operating process flow.

That is, in the detailed description according to an embodiment of the present disclosure to be provided below, an analog beam operating scheme (scenario) will be described using a frame structure including signal standards and an operation processing flow. Also, analog beam designing using effective channel information will be described.

Hereinafter, the present disclosure will be described in detail with reference to the accompanying drawings.

FIG. 1 illustrates a BDMA system in a multi-user environment for application according to an embodiment of the present disclosure. That is, a wireless communication environment in FIG. 1 assumes that a BS having a dual-stage beam-forming structure communicates with multiple terminals using a single antenna. The BDMA system illustrated in FIG. 1 assumes that an analog beam operation for beam allocation for the multiple terminals is performed by a BS.

Referring to FIG. 1, a BS 120 allocates analog beams to at least one terminal among multiple terminals $S_1$-$S_K$ 110_1 through 110_K, and communicates with the at least one terminal by using the allocated analog beams.

For example, the BS 120 forms a wireless terminal (or MS)-specific channels $h_1$ through $h_K$ for all antennas, for example, M antennas, to communicate with the K wireless terminals $S_1$-$S_K$ 110_1 through 110_K. That is, when the BS 120 uses analog beams W (not shown), the effective channels $h_1$ through $h_K$ are formed for respective wireless terminals for all the analog beams that are being used. The effective channels formed for the respective wireless terminals may be defined as $h_1 \cdot W$ through $h_K \cdot W$. Thus, all the analog beams affect channels of the wireless terminals $S_1$-$S_K$ 110_1 through 110_K.

Each of the multiple terminals $S_1$-$S_K$ 110_1 through 110_K measures an effective channel quality. The effective channel quality indicates a channel quality measured for at least one effective channel that affects the BS 120 among the channels $h_1$ through $h_K$ formed by the BS 120. Each of the multiple terminals $S_1$-$S_K$ 110_1 through 110_K transmits a pilot signal that enables the BS 120 to obtain effective channel information corresponding to channel quality measurement.

For example, the effective channel information may be Channel State Information (CSI) as well as Channel Quality Information (CQI) indicating a quality of a channel. The CSI may include information about a direction of a channel.

The BS 120 obtains effective channel information for at least one of the multiple terminals $S_1$-$S_K$ 110_1 through 110_K. For example, the BS 120 may obtain the effective channel information by using a pilot signal transmitted by at least one terminal. The BS 120 operates an analog beam based on obtained effective channel information. A target of the analog beam operation may be the multiple terminals $S_1$-$S_K$ 110_1 through 110_K or one or plural terminals that request service use among the multiple terminals $S_1$-$S_K$ 110_1 through 110_K. That is, the BS 120 performs beam-forming using analog beams for the multiple terminals $S_1$-$S_K$ 110_1 through 110_K or some of them.

To this end, the BS 120 has a hybrid beam-forming structure including an analog stage and a digital stage. The analog stage includes a large number of antennas, for example, M antennas and the digital stage includes a small number of digital chains, for example N RF chains.

The analog stage performs an analog beam-forming operation during the hybrid beam-forming operation. The digital stage performs a digital beam-forming operation during the hybrid beam-forming operation.

For example, the number of N RF chains, N, corresponds to the number of multiple terminals $S_1$-$S_K$ 110_1 through 110_K, K. Thus, it may be seen that the number of antennas, M, is greater than the number of multiple terminals $S_1$-$S_K$ 110_1 through 110_K, K.

The analog stage may include an analog beam-forming operating unit 122. The digital stage may include analog-to-digital converters 124 and 126 and a digital beam-forming operating unit 128. The analog-to-digital converters (ADCs) 124 and 126 correspond to the N RF chains.

The analog beam-forming operating unit 122 adaptively operates analog beams according to a service request of at least one of the multiple terminals $S_1$-$S_K$ 110_1 through 110_K. The operating protocol and information standards need to be defined for an adaptive analog beam operation. The analog beam-forming operating unit 122 operates analog beams based on effective channel information fed back by the multiple terminals $S_1$-$S_K$ 110_1 through 110_K. The analog beam-forming operating unit 122 may estimate the effective channel information from a received signal.

The ADCs 124 and 126 convert analog signals output by the analog beam-forming operating unit 122 into digital signals, and output the converted digital signals.

The digital beam-forming operating unit 128 operates digital beams using the digital signals output by the ADCs 124 and 126 as inputs. The digital beam-forming operating unit 128 may operate digital beams by using effective channel information estimated for some or all of the multiple terminals $S_1$-$S_K$ 110_1 through 110_K. The effective channel information may be estimated based on a pilot signal transmitted by a terminal.

Figure 2:
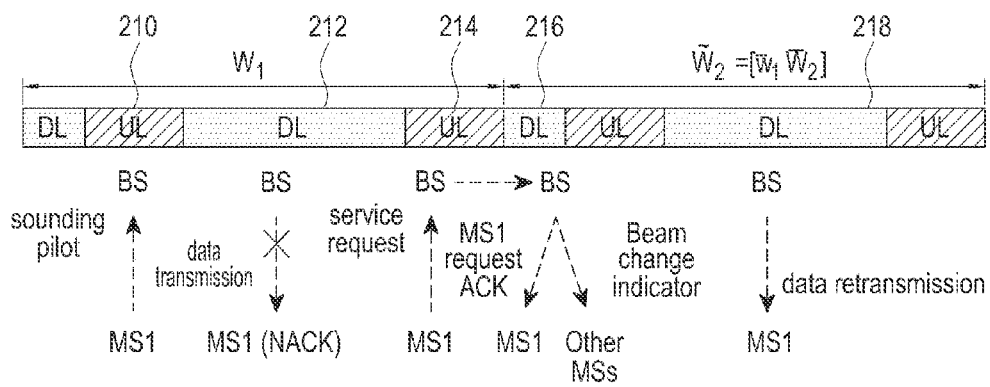
FIG. 2 illustrates a scenario of an analog beam operation according to an embodiment of the present disclosure.

FIG. 2 illustrates a scenario of an analog beam operation according to an embodiment of the present disclosure.

The scenario illustrated in FIG. 2 pertains to an example in which uplink and downlink signals are transmitted on a frame basis. The frame has a structure for supporting a Time Division Duplex (TDD) scheme. One frame includes two uplink transmission periods and two downlink transmission periods.

The scenario illustrated in FIG. 2 assumes that the use of the second frame (a next frame) is permitted by a service request from a wireless terminal that has transmitted data in the first frame (a current frame). That is, a proposed analog beam operation presumes that an analog beam to be used is changed in units of frames (or frame by frame) using a round-robin scheme that periodically operates a basically determined beam pattern.

In FIG. 2, it is assumed that in a situation of a communication between a BS and several terminals, if an analog beam $W_1$ is turned on in the BS, a particular terminal (a first wireless terminal) fails data reception and thus requests data retransmission in the next frame.

Referring to FIG. 2, the first wireless terminal MS1 transmits data to the BS in a first uplink transmission period 210 of the current frame. The first wireless terminal MS1 transmits a pilot signal that is to be used for the BS to obtain effective channel information.

The data and the pilot signal are transmitted using the analog beam $W_1$. The analog beam $W_1$ has been allocated to the current frame by the BS based on a basic analog beam operation.

The BS receives data transmitted from the first wireless terminal MS1 in the uplink transmission period 210. The BS transmits a response signal corresponding to reception of the data to the first wireless terminal MS1 in a downlink transmission period 212 located next to the uplink transmission period 210 in which the data has been received.

In FIG. 2, it is assumed that the first wireless terminal MS1 fails to normally receive the response signal transmitted by the BS in the downlink transmission period 212. The situation in which the first wireless terminal MS1 fails to normally receive the response signal may include two cases.

The first case is transmission of Negative Acknowledgement (NACK) as a response signal from the BS. The second case is a case in which the BS transmits ACK as a response signal, but the first wireless terminal MS1 fails to receive the ACK.

In both cases, the first wireless terminal MS1 may determine that data retransmission is required. The first wireless terminal MS1 may request retransmission of data or transmission of further data from the BS. For example, in FIG. 2, the first wireless terminal MS1 sends a service request to the BS in the second uplink transmission period 214 of the current frame.

Upon receiving a service request from the first wireless terminal in the second uplink transmission period 214 of the current frame, the BS designs an analog beam to be changed using an adaptive analog beam operating scheme. When designing the analog beam to be changed, the BS may consider a basic analog beam operating environment. The BS may reflect effective channel information in designing the analog beam to be changed. The effective channel information may be obtained by the BS through reception of a pilot signal transmitted from the first wireless terminal MS1 or other wireless terminals. The BS may determine whether to permit the use of the next frame by the first wireless terminal that requests the service, before designing the analog beam to be changed.

Once the BS determines to permit the use of the next frame by the first wireless terminal, the BS determines an analog beam $\tilde{W}_2 = \overline{W}_1 \epsilon W'_2$ to be changed by the adaptive analog beam operating scheme that considers a basic analog beam operating environment and a service request of the first wireless terminal MS1 together.

Herein, $\overline{W}_1$ represents information indicating analog beams designed using effective channel information of a wireless terminal that requests a service, and $W'_2$ represents information indicating the remaining analog beams except for the designed beams $\overline{W}_1$ among analog beams $W_2$ to be used in a target frame.

Thus, it may be desirable to design an analog beam determined to be used as a semi-adaptive beam in such a way that the analog beam is optimized for a wireless terminal for which the use of a target frame is permitted.

For example, when it is determined to use the semi-adaptive beam, the BS determines a beam and a terminal that are to be excluded from the use as the semi-adaptive beam. To this end, it is assumed that the BS has an already known type and amount of data to be provided to wireless terminals, a service priority, a required Quality of Service (QoS), and the like. Under this assumption, the BS predicts a channel state and/or an expected data rate in an upper layer based on the known information and performs scheduling based on a result of the prediction. Through the scheduling performed in each frame, the BS determines at least one wireless terminal to be served in a target frame and determines a beam to be used and a beam not to be used for the determined at least one wireless terminal. Using the previously-determined beam preferred by each wireless terminal, the BS may determine the beam to be used and the beam not to be used.

Eventually, upon receiving a service request from a wireless terminal, the BS determines whether to provide a service in a target frame, collectively taking a required QoS, a service priority, an expected data rate, and the like, of each wireless terminal into account in a scheduling operation. Thereafter, if there is a wireless terminal that requests a service among wireless terminals that are to be provided with services in a target frame, the BS determines to apply a semi-adaptive beam for a corresponding service. On the other hand, if there is no wireless terminal that requests a service among the wireless terminals that are to be provided with the services in the frame, the BS determines to apply a predefined beam for a corresponding service.

Once it is determined whether to permit the use of a frame by the first wireless terminal that requests a service and determined a semi-adaptive beam to be applied, the BS transmits a response signal MS1 Request ACK indicating that the use of the next frame (a target frame) is permitted to the first wireless terminal.

The BS may deliver information indicating that a beam to be applied to the next frame is changed, for example, a beam change indicator, to other wireless terminals. For example, the BS may transmit the response signal MS1 Request ACK and the beam change indicator for indicating that the beam to be applied to the next frame is changed in the first downlink transmission period 216 of the next frame (the target frame).

In the second downlink transmission period 218, the BS retransmits data that the first wireless terminal fails to receive to the first wireless terminal for which signal transmission and reception in the target frame is permitted. Although not shown, in the first or second uplink transmission period, the first wireless terminal may transmit data that the first wireless terminal has failed in transmitting to the BS or transmit further data to the BS.

Figure 3:
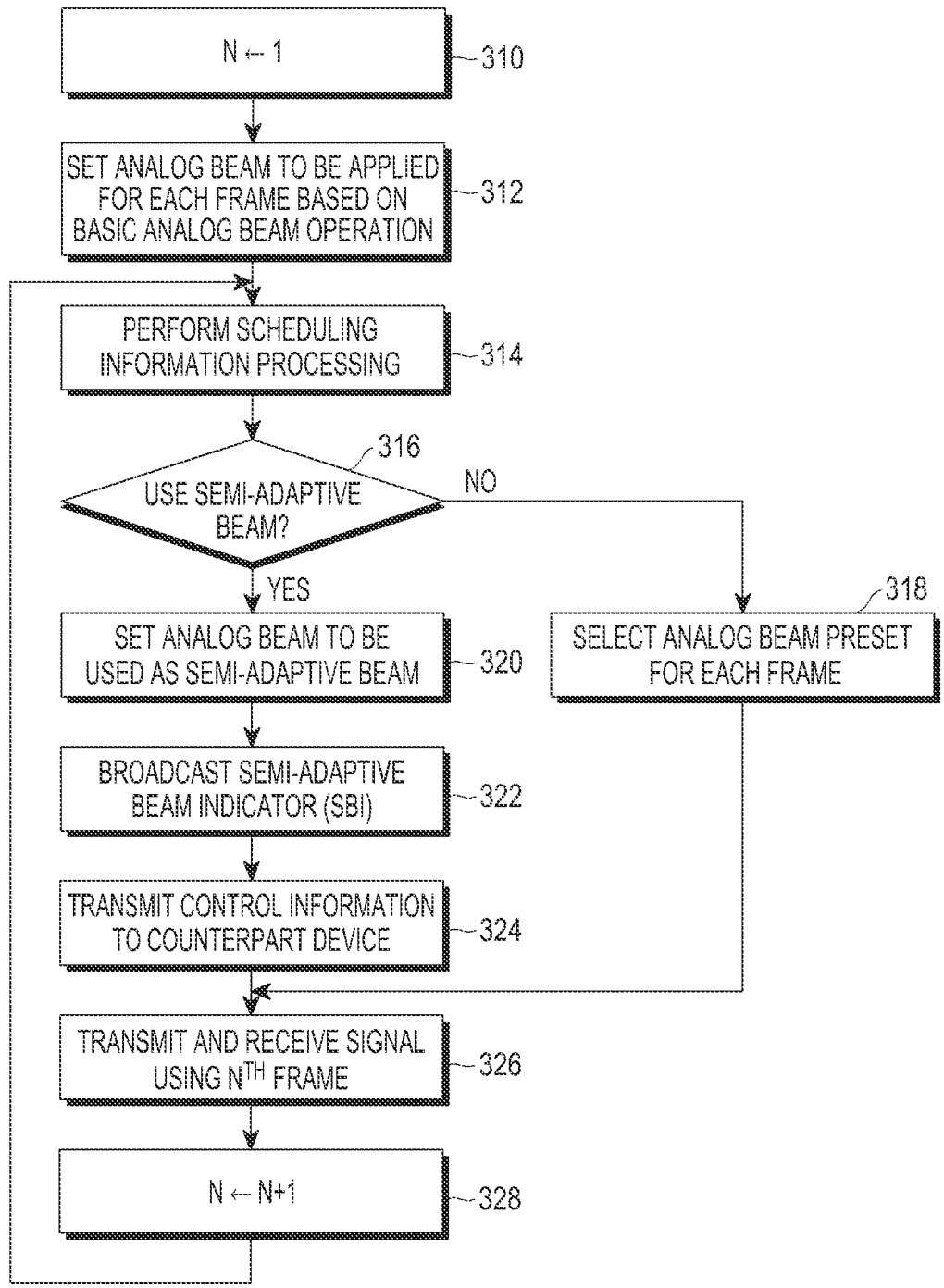
FIG. 3 illustrates a control flow performed by a Base Station (BS) for adaptive analog beam designing considering a request of a terminal according to an embodiment of the present disclosure.

FIG. 3 illustrates a control flow performed by a BS for adaptive analog beam designing considering a request of a terminal according to an embodiment of the present disclosure.

Referring to FIG. 3, the BS performs initialization for adaptive analog beam designing considering a request of a wireless terminal in operations 310 and 312.

For example, the BS initializes an index N for identifying a frame to 1 in operation 310. The frame may be defined to support a TDD scheme. The BS sets an analog beam to be applied for each frame if a service request from the wireless terminal is not received, in operation 312. For example, if the service request from the wireless terminal is not received, the BS may set an analog beam to be applied for each frame by using a basic analog beam operating scheme. The basic analog beam operating scheme may be a general analog beam operating scheme that does not consider a service request from the wireless terminal.

The BS predicts a channel state, an expected data rate, or the like to perform scheduling in operation 314. The scheduling performed by the BS determines whether to use a semi-adaptive beam and determines which beam and which terminal are to be excluded from a service using a target frame if it is determined to use the semi-adaptive beam. For example, the BS determines whether a wireless terminal having requested the use of a target frame exists and determines a wireless terminal for which the use of the target frame is to be permitted based on processing of scheduling information. The scheduling information may include type and amount of data to be served, a service priority, a required QoS, and so forth. The BS also determines whether the wireless terminal for which the use of the target frame is to be permitted is the wireless terminal having requested the service.

The BS determines whether to use a semi-adaptive beam in the target frame, according to whether the wireless terminal for which the use of the target frame is to be permitted has requested the service, in operation 316.

If the BS determines whether not to use the semi-adaptive beam, the BS selects an analog beam that is preset for each frame in operation 318. Thus, in the target frame, signal transmission and reception may be performed using an analog beam that is preset by the basic analog beam operating scheme.

If the BS determines whether to use the semi-adaptive beam, the BS designs an analog beam to be used as the semi-adaptive beam in operation 320. That is, the BS designs an optimal analog beam for the wireless terminal for which the use of the target frame is permitted. The BS sets the designed analog beam as the semi-adaptive beam. Setting of the semi-adaptive beam may be performed in the above-described processing of the scheduling information.

The target frame is to be used by the particular wireless terminal determined as described before, and the BS transmits identification information of a semi-adaptive beam to be applied in the use of the target frame (for example, a Semi-adaptive Beam Indicator (SBI)) to the particular wireless terminal and other wireless terminals in operation 322.

For example, the SBI is used to indicate that the semi-adaptive beam is determined to be used for all the wireless terminals. In an implementation example for this end, if a downlink carries a Physical Downlink Control Channel (PDCCH)-related signal, a determination may be made regarding the semi-adaptive beam by using 1-bit information. In this case, the BS transmits 1 or 0 such that when wireless terminals decode a PDCCH, they may determine whether the semi-adaptive beam is used. That is, if a resource allocated for the SBI is decoded, all the wireless terminals may recognize a response to the determination of the BS regarding the semi-adaptive beam.

If the SBI is detected, a wireless terminal having requested a service decodes control information provided by a control channel to use a service in a target frame.

The SBI helps operations of other wireless terminals that are not permitted to use the service in the target frame. For example, since the current beam is not a preset beam for use in case of absence of a service request from a wireless terminal, the SBI helps in determining not to use information about a used beam or determining to rest for a while in a frame using the semi-adaptive beam and to attempt an access to another frame in an uplink.

As discussed above, through the control channel, the BS transmits the control information, which is required for the wireless terminal for which the use of the target frame is permitted in response to the service request to use the service in the target frame, in operation 324.

The BS performs signal transmission and reception in the target frame, that is, an $N^{th}$ frame in operation 326. The signal transmission and reception in the $N^{th}$ frame may be distinguished according to whether the semi-adaptive beam is used.

Once the BS determines whether not to use the semi-adaptive beam, the BS transmits and receives a signal in the $N^{th}$ frame through a predetermined analog beam. The predetermined analog beam may be preset for the $N^{th}$ frame by using the basic analog beam operating scheme.

However, if the BS determines whether to use the semi-adaptive beam, the BS transmits and receives a signal in the $N^{th}$ frame through the semi-adaptive beam. The semi-adaptive beam may be an optimal analog beam designed for the wireless terminal for which the use of the target frame is permitted.

The BS increases a value of N by 1 in operation 328 to designate the next frame. The BS performs operations for signal transmission and reception in the next frame in operations 312 through 326.

Figure 4:
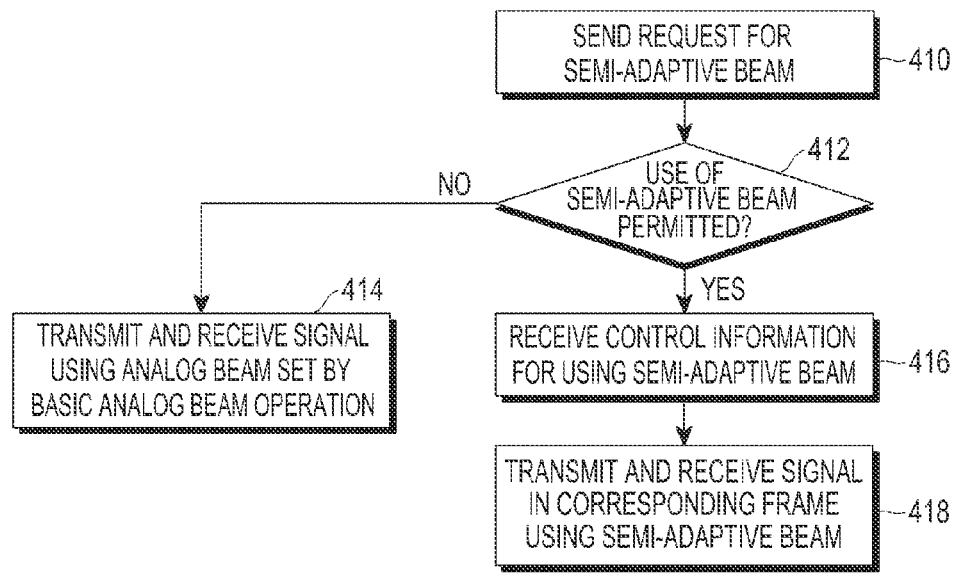
FIG. 4 illustrates a control flow performed by a Mobile Station (MS) according to an embodiment of the present disclosure.

FIG. 4 illustrates a control flow performed by a wireless terminal according to an embodiment of the present disclosure. The control flow illustrated in FIG. 4 follows an operation in which the wireless terminal sends a service request for the use of the next frame to the BS.

Referring to FIG. 4, the wireless terminal sends a service request for using the next frame to the BS in operation 410. The service request is sent when there is data to be retransmitted due to a transmission failure or there is further data to be transmitted. To determine a wireless terminal that is to use a frame at the request of the wireless terminal, rather than by using the general round-robin scheme, a determination regarding a semi-adaptive beam is required. Thus, the service request of the wireless terminal may be regarded as a request for the determination regarding the semi-adaptive beam.

The wireless terminal determines whether the BS permits the use of the semi-adaptive beam in response to the service request of the wireless terminal in operation 412. For example, if the SBI is broadcast from the BS, the wireless terminal having requested the service determines that the use of the semi-adaptive beam is permitted, and the wireless terminal not having requested the service determines that the use of the semi-adaptive beam is permitted to another wireless terminal.

In another example, the service request may be sent by a plurality of wireless terminals. In this case, even when sending the service request, the wireless terminal should not determine that the use of the semi-adaptive beam is permitted. To this end, the BS may broadcast information identifying the wireless terminal for which the use of the target frame is to be permitted.

If the use of the semi-adaptive beam is not permitted to any wireless terminal as well as that the use of the semi-adaptive beam is permitted to one of the plurality of wireless terminals having sent the service request. The wireless terminal performs signal transmission and reception with the BS through a predetermined analog beam if the use of the semi-adaptive beam is not permitted in operation 414. The predetermined analog beam may be preset to a target frame by using the basic analog beam operation.

However, if the use of the semi-adaptive beam is permitted, the wireless terminal receives control information provided from the BS through the control channel in operation 416. The control information received at this time is control information required for signal transmission and reception in the target frame through the semi-adaptive beam whose use is permitted.

Upon receiving the control information for the use of the semi-adaptive beam, the wireless terminal performs signal transmission and reception in a corresponding frame using the semi-adaptive beam by using the received control information, in operation 418.

Although an operation to be performed by a wireless terminal that has not requested a service is not defined in FIG. 4, the operation of the wireless terminal may also be assisted by SBI detection. For example, upon detection of an SBI, the wireless terminal having not requested a service may recognize that an analog beam that is preset by the basic analog beam operating scheme is not to be used in the target frame. Thus, the wireless terminal having not requested the service is not to use information regarding a preset analog beam. The wireless terminal having not requested the service rests on a frame using the semi-adaptive beam for a while in the uplink and attempts an access in another frame.

As proposed above, upon receiving a service request requesting the use of the next frame from the wireless terminal, the BS designs an analog beam that is to be used as the semi-adaptive beam.

Thus, a description will be made of one example of the adaptive analog beam designing scheme that designs an analog beam to be used as the semi-adaptive beam by using estimated effective channel information.

Figure 5:
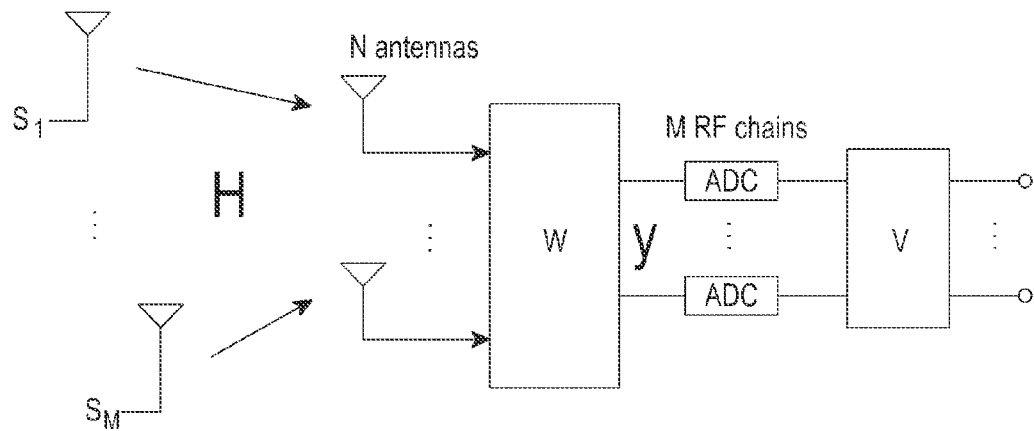
FIG. 5 illustrates a signal model for describing adaptive analog beam designing according to an embodiment of the present disclosure.

FIG. 5 illustrates a signal model for describing adaptive analog beam designing according to an embodiment of the present disclosure.

Referring to FIG. 5, a signal y output from the analog stage may be defined as:

$$y = W^H H s + W^H n \quad \text{Equation (1)}$$

where W represents characteristic information of an analog beam corresponding to a semi-adaptive beam based on an analog beam operation. H represents channel characteristics between a wireless terminal and a BS, s represents a signal transmitted by the wireless terminal, and n represents a noise component.

In Equation 1, respective signals may be defined as $y \in \mathbb{C}^{M \times 1}$, $W \in \mathbb{C}^{N \times M}$, $H \in \mathbb{C}^{N \times M}$, $s \in \mathbb{C}^{M \times 1}$, and $n \in \mathbb{C}^{N \times 1}$. Herein, N represents the number of antennas and M represents the number of digital chains.

Generally, an analog beam is designed to maximize a Signal to Noise Ratio (SNR) of a received signal. In this regard, an SNR induced from Equation 1 may be expressed as follows:

$$SNR = \frac{\|W^H H s\|^2}{\|W^H n\|^2} \quad \text{Equation (2)}$$

$$= E_{s,n}\left[\frac{s^H H^H W W^H H s}{n^H W W^H n}\right]$$

$$= \frac{tr(H^H W E_s[ss^H] W^H H)}{tr(W^H E_n[nn^H] W)}$$

$$= \frac{tr(W^H H H^H W)}{\sigma^2 tr(W^H W)}$$

$$(\because E_s[ss^H] = I, E[nn^H] = \sigma^2 I)$$

For example, for K users, channel characteristics H may be defined as:

$$H = [h_1, \ldots, h_K], HH^H = h_1 h_1^H + \ldots + h_K h_K^H \quad \text{Equation (3)}$$

Once an equation for a single user is developed based on Equation 3, it may be arranged for all users. In an equation developing process to be described below, a user index will be omitted for convenience.

When a channel is expressed with an effective channel including an analog beam, it may be defined as Equation 4.

$$\bar{h} = W_1^H h, \tilde{h} = (W_1^\perp)^H h \, (\tilde{h}_1 h: \text{unknown}) \quad \text{Equation (4)}$$

Since a beam is $W_1$ when a pilot signal for channel estimation is received in the first frame, effective channel information estimated in this case may be defined by Equation 4.

Equation 5 may express Equation 4 separately with effective channel information that estimates all the channels and unknown channel information.

$$\begin{bmatrix} W_1^H \\ (W_1^\perp)^H \end{bmatrix} h = \begin{bmatrix} \bar{h} \\ \tilde{h} \end{bmatrix} \rightarrow h \quad \text{Equation (5)}$$

$$= [W_1 \; W_1^\perp] \begin{bmatrix} \bar{h} \\ \tilde{h} \end{bmatrix}$$

$$= W_1 \bar{h} + W_1^\perp \tilde{h}$$

Generally, analog beam designing is intended to maximize an average SNR of a reception signal. Equation 6 defines an average SNR of a reception signal based on adaptive analog beam designing using estimated effective channel information.

$$\bar{\gamma} = \frac{E_{h|\bar{h}=h_{eff}}[tr(W^H h h^H W)]}{\sigma^2 tr(W^H W)} \quad \text{Equation (6)}$$

$$\triangleq \text{Average } SNR \text{ for one user,}$$

where a numerator term of the average SNR may be arranged into $R \triangleq E_{h|\bar{h}=h_{eff}}(hh^H)$. Equation 7 provided below defines other analog beams that are orthogonal to the analog beam that is used in the previous frame. Let $W_1 = N \times M$ sub-DFT matrix $W_1^\perp = N \times (N-M)$ sub-DFT matrix=remaining part of $N \times N$ DFT matrix except $W_1$      Equation (7)

Equation 8 arranges the average SNR by using terms defined in Equation 7.

$$R = W_1 \bar{h} \bar{h}^H W_1^H + W_1 E_{h|\bar{h}=h_{eff}}[\bar{h}\tilde{h}^H](W_1^\perp)^H + \quad \text{Equation (8)}$$

$$W_1^\perp E_{h|\bar{h}_{eff}}[\tilde{h}\bar{h}^H](W_1)^H + W_1^\perp E_{h|\bar{h}=h_{eff}}[\tilde{h}\tilde{h}^H](W_1^\perp)^H$$

If a value known from a conditional average is taken out of expectation in Equation 8, Equation 9 may be obtained as follows:

$R = W_1 \bar{h}\bar{h}^H W_1^H + W_1 h_{eff} E_{h|\bar{h}=h_{eff}}[\tilde{h}^H](W_1^\perp)^H + W_1^\perp E_{h|\bar{h}=h_{eff}}[\tilde{h}]h_{eff}^H(W_1)^H + W_1^\perp E_{h|\bar{h}=h_{eff}}[\tilde{h}\tilde{h}^H](W_1^\perp)^H$    Equation (9)

In Equation 9, terms including a conditional average may be obtained based on mathematical knowledge regarding the conditional average, that is, by using Equation 10.

$E_h(\bar{h}) = E_h(\tilde{h}) = 0 \; \Sigma_{11} = W_1^H Q W_1 \; \Sigma_{12} = W_1^H Q(W_1^\perp)$ $Q \triangleq E_h(hh^H) \; \Sigma_{21} = (W_1^\perp)^H Q W_1 \; \Sigma_{22} = (W_1^\perp)^H Q(W_1^\perp)$ If $\bar{h} = h_{eff} \; E_{h|\bar{h}=h_{eff}}[\tilde{h}] = E_h[\tilde{h}] + \Sigma_{21}\Sigma_{11}^{-1}(h_{eff} - E_h[\bar{h}])$ $E_{h|\bar{h}=h_{eff}}[\tilde{h}\tilde{h}^H] = \Sigma_{22} - \Sigma_{21}\Sigma_{11}^{-1}\Sigma_{12}$      Equation (10)

Based on the foregoing description, an optimization problem for analog beam designing may be finally arranged as follows:

$$\max_{W} \bar{\gamma} \text{ s.t } W^H W = I \quad \text{Equation (11)}$$

$$\leftrightarrow \max_{W} tr(W^H R_{total} W) \text{ s.t } W^H W = I,$$

$$\bar{\gamma} = \frac{tr(W^H R_{total} W)}{\sigma^2 tr(W^H W)},$$

$$R_{total} \triangleq R_1 + \ldots + R_K$$

Equation 12 is defined to obtain an analog beam corresponding to a semi-adaptive beam based a solution of the optimization problem of Equation 11.

$$W_1 = \text{dominant eigenvector of } R_{total} \quad \text{Equation (12)}$$

In Equation 12, the analog beam corresponding to the semi-adaptive beam is predicted by a dominant eigenvector corresponding to a sum ($R_{total}$) of estimated average SNRs for respective multiple devices.

The analog beam designing based on an analog beam-forming operation in the analog stage has been described above. In addition, in the digital stage, digital beam designing based on a digital beam-forming operation is performed for effective channels including an analog beam. For example, let effective channel information $\bar{H} \cong W^H H$, then Equation 13 defines an example of digital beam designing by using a typically known zero-forcing criterion $$\text{Single user: } V = \frac{\bar{H}}{\|\bar{H}\|} \Big/ \text{Multi-user: } V = \frac{\bar{H}^\dagger}{\|\bar{H}^\dagger\|} \quad \text{Equation (13)}$$

$(*)^\dagger$: pseudo inverse

Figure 6:
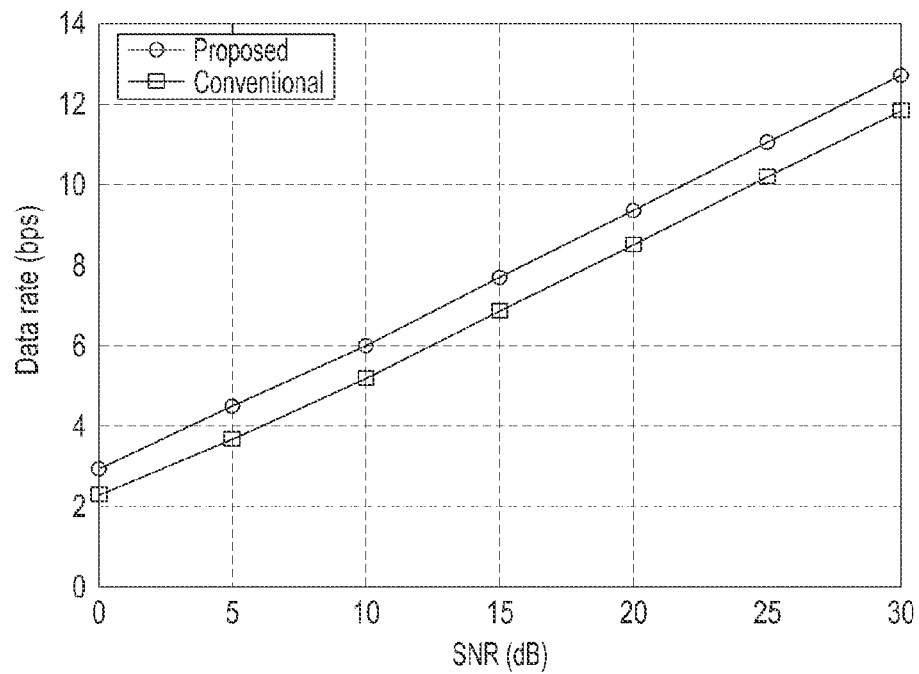
FIGS. 6 and 7 show capacity comparison between a proposed scheme and a conventional scheme according to an embodiment of the present disclosure.
Figure 7:
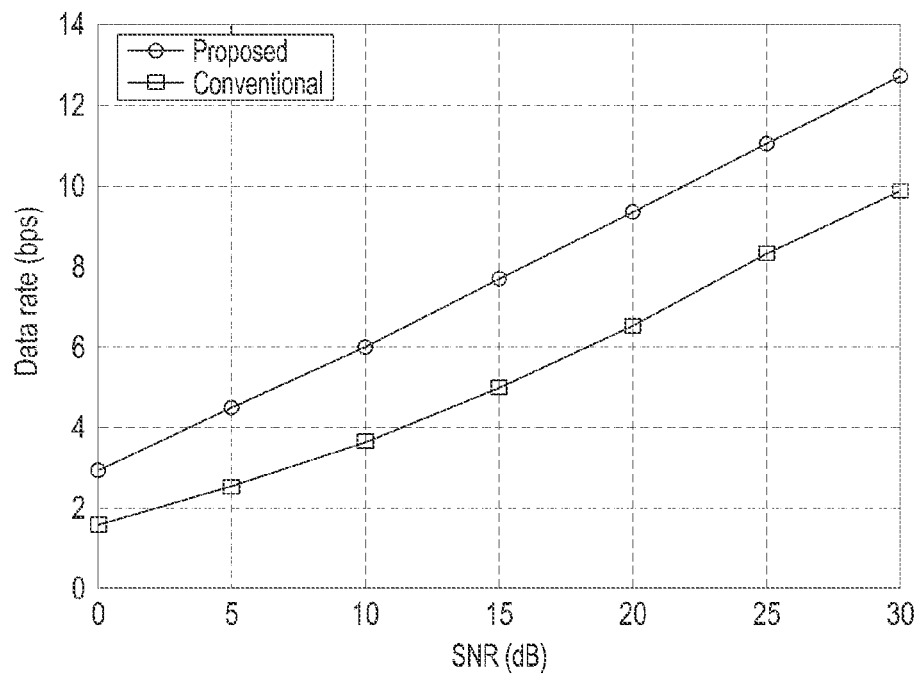

FIGS. 6 and 7 show capacity comparison between a proposed scheme and a conventional scheme.

Referring to FIG. 6, a data rate result of a test under a simulation environment in which an i.i.d Rayleigh fading channel environment, 16 antennas, and 4 digital chains are provided and a data rate of a first wireless terminal is checked is illustrated. That is, the proposed scheme according to the present disclosure may provide a data rate gain of about 13% with respect to an SNR of about 15 dB when compared to the conventional scheme.

Referring to FIG. 7, a data rate result of a test under a simulation environment in which a correlated channel environment (an angular speed=10), 16 antennas, and 4 digital chains are provided and a data rate of a first wireless terminal is checked is illustrates. That is, the proposed scheme according to the present disclosure may provide a data rate gain of about 50% with respect to an SNR of about 15 dB when compared to the conventional scheme.

A different exists between the two schemes, that is, the conventional scheme experiences data rate degradation when a fixed beam is maintained, whereas the proposed scheme provides a data rate gain by maintaining a data rate through the proposed beam operation. Therefore, by adapting a beam to a terminal according to the proposed analog beam operating protocol, a data rate may be enhanced.

Thus, the proposed scheme is expected to be applicable as an analog beam operating scheme suitable for a hybrid beam-forming system having a structure with a large number of antennas and a small number of digital chains, such as a BS (a macro BS and a distributed small BS) in a VCN/BDMA integrated network system.

For example, the adaptive analog beam-forming operating scheme proposed in the present disclosure may be equally applied to a terminal in a scenario where the terminal performs multiple access/broadcasting. In this case, when the terminal performs multiple access/broadcasting, it means that the terminal simultaneously transmits and receives multiple data to and from different sources.

According to the proposed disclosure, it is possible to actively handle a service request of a terminal in a basic analog beam operating environment. Moreover, by adaptively designing an analog beam suitably for a channel based on effective channel information for the basic analog beam operation, an SNR of transmission and reception signals may be improved, leading to a data rate gain of the system.

Furthermore, in the proposed disclosure, analog beams are partially changed in response to a request of a terminal using a round-robin scheme, thereby preventing a delay that may occur in the round-robin scheme.

Other effects that may be obtained or estimated from the embodiments of the present disclosure are explicitly or implicitly disclosed in the detailed description of the embodiments of the present disclosure. That is, various effects expected according to the embodiments of the present disclosure are disclosed in the detailed description of the present disclosure.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an analog beam in an analog beam operating apparatus using a hybrid beam-forming structure having a small number of digital chains provided in a digital stage, and transmitting and receiving a signal in a time division multiple access (TDMA) scheme, the method comprising:
receiving a request for using a next frame from at least one of multiple devices that transmit and receive signals in units of frames;
changing the analog beam based on estimated effective channel information corresponding to the at least one device for a counterpart device for which use of the next frame is to be permitted; and
transmitting information indicating that the analog beam is changed to permit the use of the next frame by the counterpart device to the multiple devices.

2. The method of claim 1, further comprising transmitting to the multiple devices, information indicating that the use of the next frame is permitted to the counterpart device determined from among the at least one device that request the use of the next frame.

3. The method of claim 1, wherein the information indicating that the analog beam is changed is transmitted in a first signal transmission period of the next frame.

4. The method of claim 1, wherein the request for using the next frame, which is received from the at least one device, is received in a last signal reception period of a current frame.

5. The method of claim 1, wherein the changing of the analog beam comprises:
receiving a pilot signal transmitted from the at least one device and estimating an effective channel corresponding to each of the at least one device based on the received pilot signal;
designing an analog beam predicted as maximizing a signal to noise ratio (SNR) corresponding to a received signal in the next frame by using the estimated effective channel; and
determining the designed analog beam as the analog beam to be changed.

6. The method of claim 5, wherein the analog beam predicted as maximizing the SNR is predicted by a dominant eigenvector corresponding to a sum of estimated average SNRs corresponding to the respective multiple devices.

7. The method of claim 1, further comprising transmitting control information required for the counterpart device to transmit a signal using the changed analog beam in the next frame to the counterpart device through a physical downlink control channel (PDCCH).

8. An apparatus for operating an analog beam using a hybrid beam-forming structure having a small number of digital chains provided in a digital stage, and transmitting and receiving a signal in a time division multiple access (TDMA) scheme, the apparatus comprising:
a communication unit configured to:
receive a request for using a next frame from at least one of multiple devices that transmit and receive signals in units of frames, and
transmit information indicating that the analog beam is changed to permit the use of a next frame by a counterpart device to the multiple devices; and
an analog beam-forming operating unit configured to change the analog beam based on estimated effective channel information corresponding to the at least one device for the counterpart device for which use of the next frame is to be permitted.

9. The apparatus of claim 8, wherein the communication unit is further configured to transmit to the multiple devices, information indicating that the use of the next frame is permitted to the counterpart device determined from among the at least one device that request the use of the next frame.

10. The apparatus of claim 8, wherein the communication unit is further configured to transmit the information indicating that the analog beam is changed in a first signal transmission period of the next frame.

11. The apparatus of claim 8, wherein the communication unit is further configured to:
receive the request for using the next frame from the at least one device in a last signal reception period of a current frame, and
provide the received request to the analog beam-forming operating unit.

12. The apparatus of claim 8, wherein the analog beam-forming operating unit is further configured to:
receive a pilot signal transmitted from the at least one device to estimate an effective channel corresponding to each of the at least one device based on the received pilot signal,
design an analog beam predicted as maximizing a signal to noise ratio (SNR) corresponding to a received signal in the next frame by using the estimated effective channel, and
determine the designed analog beam as the analog beam to be changed.

13. The apparatus of claim 12, wherein the analog beam-forming operating unit is further configured to predict the analog beam predicted as maximizing the SNR by a dominant eigenvector corresponding to a sum of estimated average SNRs corresponding to the respective multiple devices.

14. The apparatus of claim 8, wherein the communication unit is further configured to transmit control information required for the counterpart device to transmit a signal using the changed analog beam in the next frame to the counterpart device through a physical downlink control channel (PDCCH).

15. A method for transmitting and receiving, by a wireless terminal, a signal in units of frames supporting a time division multiple access (TDMA) scheme to and from a base station (BS) with a hybrid beam-forming structure having a small number of digital chains provided in a digital stage, the method comprising:
sending a request for using a next frame to the BS in an uplink transmission period of a current frame;
receiving information about a counterpart device for which use of the next frame is permitted and information about an analog beam to be changed for the use of the next frame from the BS in a downlink transmission period of the next frame; and
transmitting and receiving a signal to and from the BS in the uplink transmission period and the downlink transmission period of the next frame by using the analog beam recognized based on the information about the analog beam to be changed, if the use of the next frame is permitted by the information about the counterpart device.

16. The method of claim 15, further comprising:
transmitting and receiving a signal to and from the BS in the uplink transmission period and the downlink transmission period of the next frame by using the analog beam predetermined by a basic analog beam operation, if the use of the next frame is permitted to another wireless terminal by the information about the counterpart device.

17. The method of claim 15, further comprising:
receiving control information required for the transmitting and receiving of the signal to and from the BS from the BS through a physical downlink control channel (PDCCH).

18. A wireless terminal for transmitting and receiving a signal in units of frames supporting a time division multiple access (TDMA) scheme to and from a base station (BS) with a hybrid beam-forming structure having a small number of digital chains provided in a digital stage, the wireless terminal comprising:
a communication unit configured to:
send a request for using a next frame to the BS in an uplink transmission period of a current frame, and
receive information about a counterpart device for which use of the next frame is permitted and information about an analog beam to be changed for the use of the next frame from the BS in a downlink transmission period of the next frame; and
a control unit configured to control the communication unit to transmit and receive a signal to and from the BS in the uplink transmission period and the downlink transmission period of the next frame by using the analog beam recognized based on the information about the analog beam to be changed, if the use of the next frame is permitted by the information about the counterpart device.

19. The wireless terminal of claim 18, wherein the control unit is further configured to control the communication unit to transmit and receive the signal to and from the BS in the uplink transmission period and the downlink transmission period of the next frame by using the analog beam predetermined by a basic analog beam operation, if the use of the next frame is permitted to another wireless terminal by the information about the counterpart device.

20. The wireless terminal of claim 18, wherein the communication unit is further configured to receive control information required for the transmitting and receiving of the signal to and from the BS from the BS through a physical downlink control channel (PDCCH).

21. The wireless terminal of claim 18,
wherein, when the use of the analog beam is not permitted to another wireless terminal and a use of the analog beam is permitted to one of a plurality of wireless terminals having sent a service request, the controller is further configured to control the communication unit to perform signal transmission and reception to the BS through a predetermined analog beam, and
wherein the predetermined analog beam being preset to a target frame by using a basic analog beam operation.

* * * * *